United States Patent [19]

Sicotte et al.

[11] Patent Number: 5,511,829
[45] Date of Patent: Apr. 30, 1996

[54] UNIVERSAL CONNECTOR FOR DOWNSPOUT DRAINAGE EXTENSION

[75] Inventors: Jean Sicotte; Denis Sicotte, both of Winnipeg, Canada

[73] Assignee: Metro Eavestroughing Ltd., Winnipeg, Canada

[21] Appl. No.: 309,642

[22] Filed: Sep. 21, 1994

Related U.S. Application Data

[63] Continuation-in-part of Ser. No. 990,046, Dec. 14, 1992, Pat. No. 5,375,891.

[51] Int. Cl.⁶ .................................................. F16L 27/00
[52] U.S. Cl. ......................... 285/176; 785/184; 785/183; 52/16; 137/615
[58] Field of Search ..................... 285/176, 184, 285/283, 177, 183, 424; 405/119–123; 137/615; 52/11, 16

[56] References Cited

U.S. PATENT DOCUMENTS

| | | | |
|---|---|---|---|
| 2,975,805 | 3/1961 | Horn | 137/615 |
| 3,316,928 | 5/1967 | Weakley | 137/615 |
| 3,911,954 | 10/1971 | Johnson | 137/615 |
| 4,270,572 | 6/1981 | Jarzynka | 137/615 |
| 4,798,028 | 1/1989 | Pinion | 52/16 |
| 5,014,745 | 5/1991 | Watt | 52/16 |
| 5,358,007 | 10/1994 | Carlberg | 52/16 |
| 5,358,066 | 10/1994 | Sween | 52/16 |
| 5,375,891 | 12/1994 | Sicotte et al. | 285/184 |

FOREIGN PATENT DOCUMENTS

| | | | |
|---|---|---|---|
| 1169224 | 6/1984 | Canada | 52/16 |
| 1188476 | 6/1985 | Canada . | |

*Primary Examiner*—Eric K. Nicholson
*Attorney, Agent, or Firm*—Bauer & Schaffer

[57] ABSTRACT

An adaptor for eavestrough downspouts has two portions of different cross sections. The first section fits outside the downspout and the other fits inside the drainage extensions. The two portions are hinged together. The adaptor is formed with step-down sized cross sections and a removable panel to allow more sizes of downspouts and extensions to be connected.

4 Claims, 4 Drawing Sheets

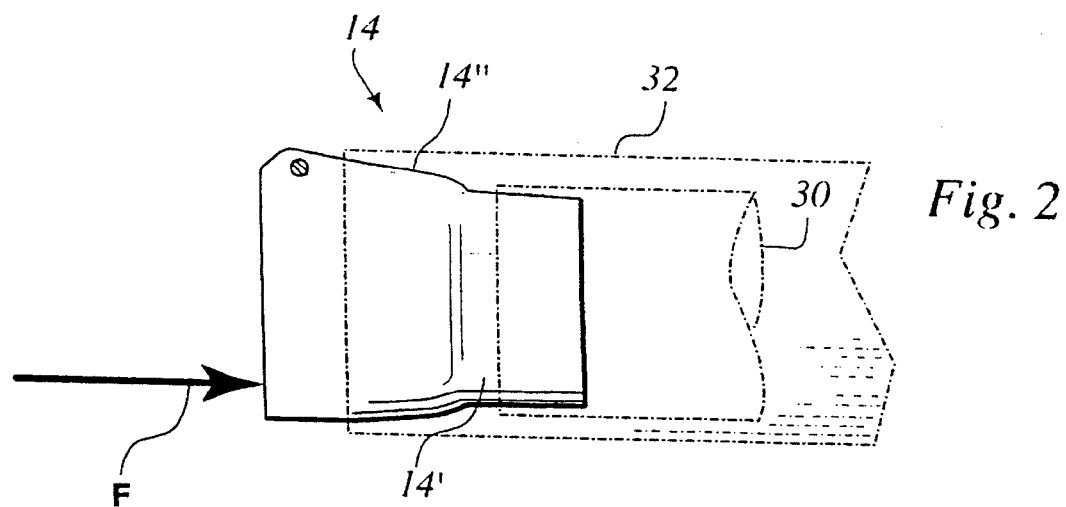
*Fig. 2*
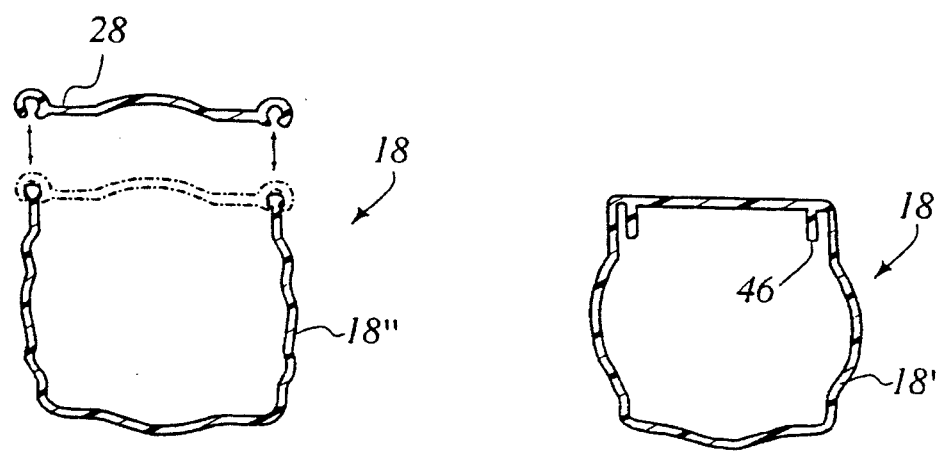
*Fig. 3A*            *Fig. 3B*

UNIVERSAL CONNECTOR FOR DOWNSPOUT DRAINAGE EXTENSION

RELATED APPLICATION

This is a continuation-in-part of Applicant's application Ser. No. 07/990,046 filed Dec. 14, 1992 now U.S. Pat. No. 5,375,891, issued Dec. 27, 1994, for which all right under 35 U.S.C. 120 is claimed.

INTRODUCTION AND DESCRIPTION OF THE PRIOR ART

The invention disclosed in U.S. Ser. No. 07/990,046 provided a universal hinged connector to connect dissimilarly cross sectioned downspouts and extensions, while still permitting the elevation of the downspout for lawn mowing or whatever purpose required. The connection is achieved by having a tube of approximately circular cross section, or more properly a square cross section with very pronounced rounded corners on the square, hinged with a second tube of approximately square cross section; more properly a square cross section with slightly rounded corners on the square. These are approximations of common forms for both downspouts and drainage extensions; and moreover, the hinged connector in that invention is provided with simple screws with instructions to apply them in appropriate configurations, so that either tube can be connected either on the exterior surface of a downspout or the interior of a drainage extension as required.

This invention is directed towards improvements in the shape of the hinged connector portions; which improvements allow more types of common residential downspouts and extensions to be accommodated by the connector. These improvements take three distinct forms:

1. The two main segments that are joined to form the connector are now each fashioned in differently-sized steps, so that multiple types of tubes will fit within the downspout portion and outside the extension portion, respectively. This will be made more clear with reference to the diagrams herein.

2. In the case of the downspout-fitting segment, the cross sections of the stepped portions are varied to conform to specific industry-standard tubing so that this tubing will be held securely.

3. Again in the case of the downspout-fitting segment, a removable face is fashioned so that one specific size of common tubing, being 2½"× 2½" square vinyl, can be accommodated by removal of the face.

With these improvements each end of the hinged connector fits at least six different shapes of industry standard pipe dimensions which are:

3" round metal pipe;

2⅝"×2⅝" square metal pipe;

2½"×2½" square vinyl pipe;

2¼"×3" rectangular vinyl pipe; and

2¾" round vinyl pipe.

The present improved connector is able to accommodate an unusually small downspout or unusually large extension simply by reversal of the connector, or by friction fitting the connector inside the downspout or outside the extension; or both. Further sizes may be accommodated by a small amount of bending of the downspouts, extensions, or connector.

Details of attachment of the connector to the downspout and extension are identical to those disclosed in U.S. Ser. No. 07/990,046 and are not illustrated or repeated herein. Reference to the aforementioned application and incorporation of its disclosure herein is made as if the aforementioned application is a part hereof.

DETAILED DESCRIPTION OF THE INVENTION

Figure 1:
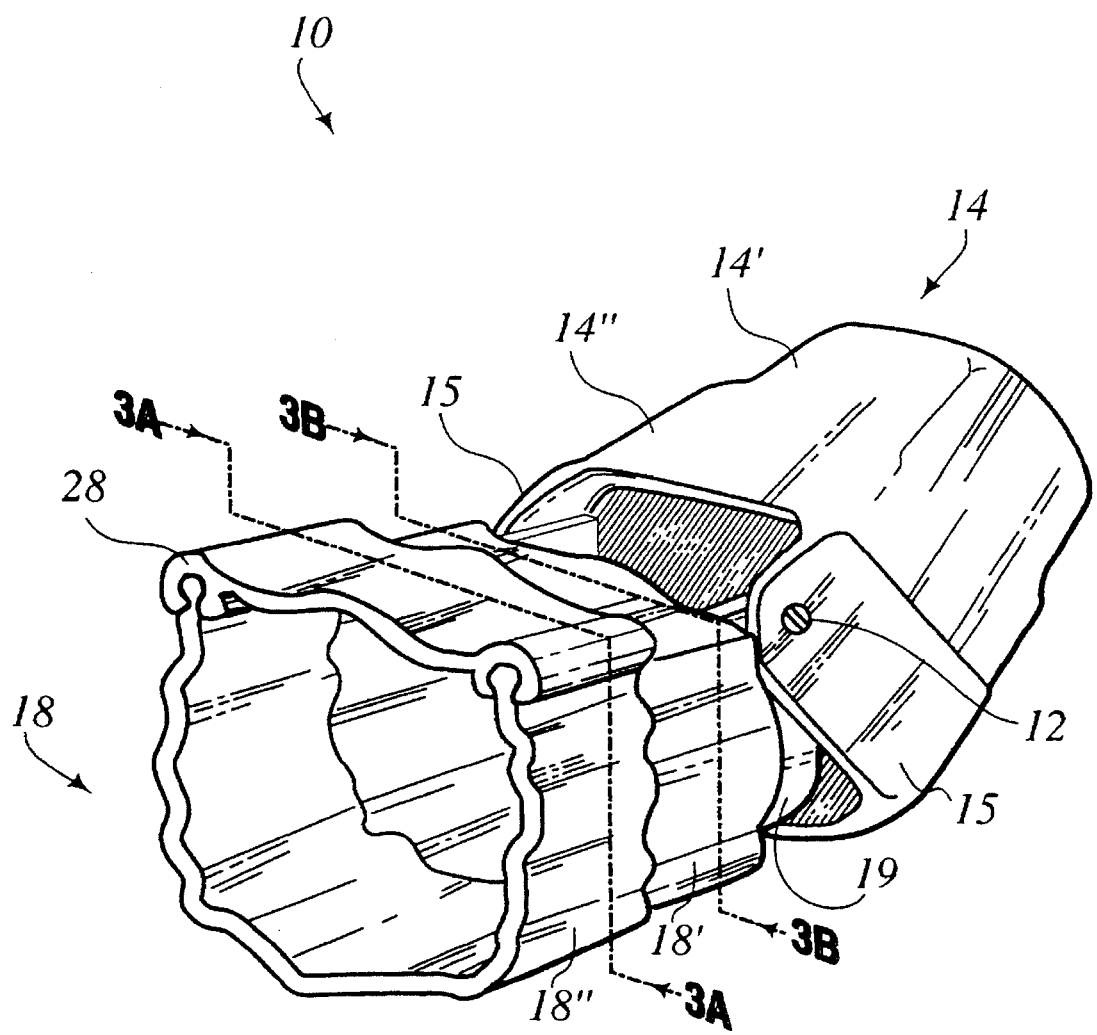
Figure 3C:
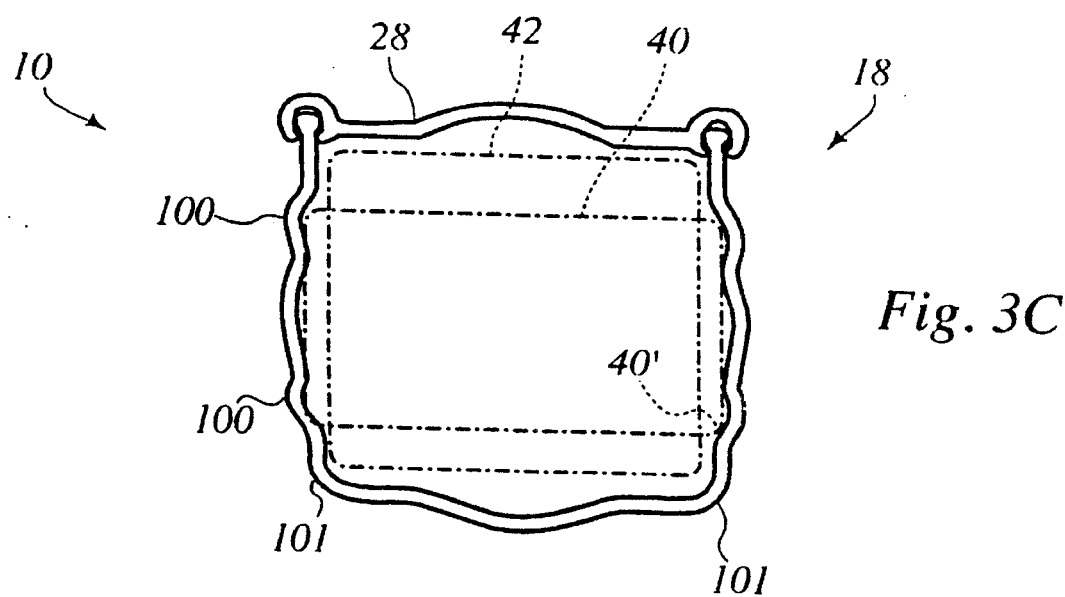
Figure 3D:
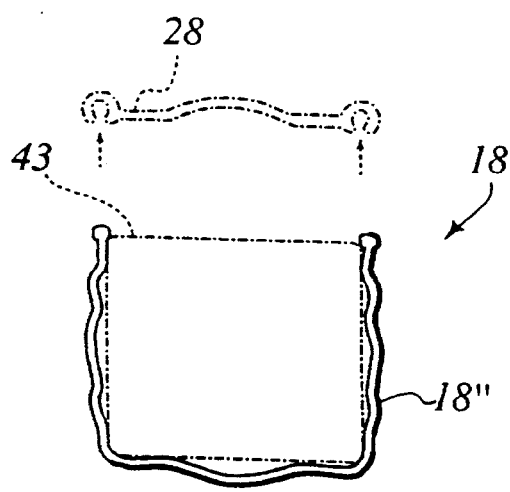
Figure 3E:
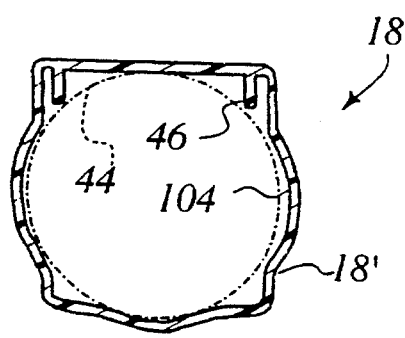
Figure 4A:
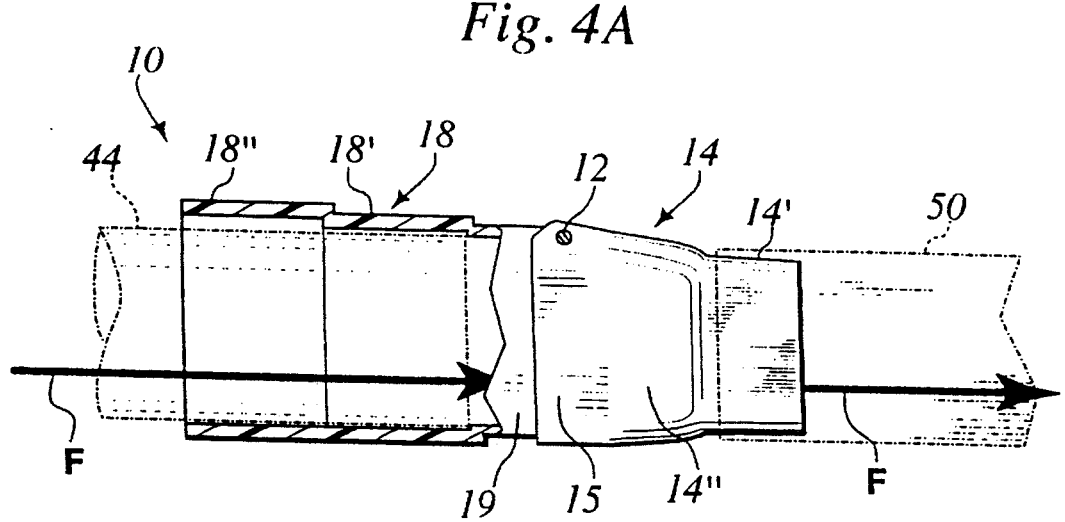
Figure 4B:
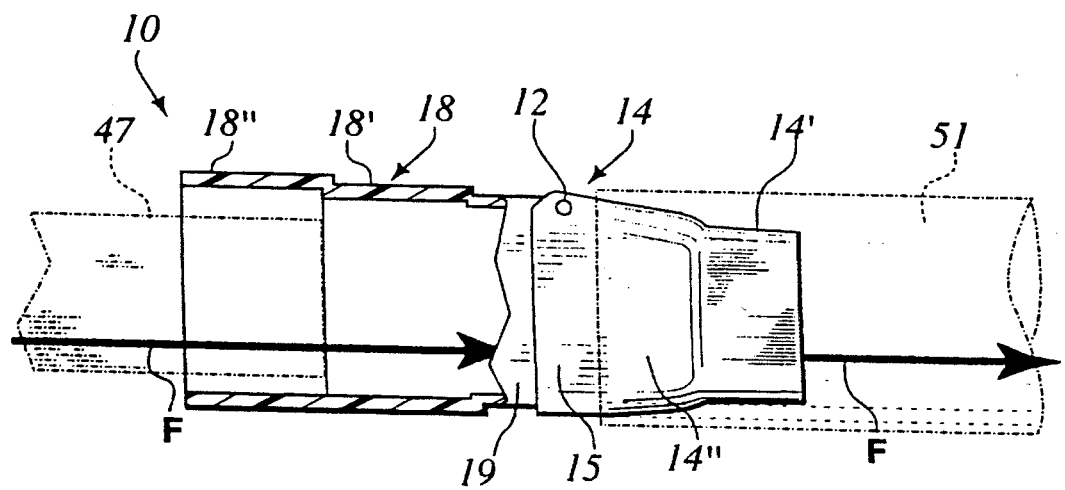

For this description, refer to the following diagrams, wherein like numerals refer to like parts;

FIG. 1, the improved hinged connector, perspective view;

FIG. 2, outflow tube segment of the improved hinged connector with ghosted drainage extensions, side elevation view;

FIG. 3A, input tube of the invented hinged connector including removable face exploded, cross section along plane 3A of FIG. 1;

FIG. 3B, input tube of the invented hinged connector, cross section along plane 3B from FIG. 1;

FIG. 3C, input tube of the invented hinged connector, with downspout pipe outlines; end view;

FIG. 3D, input tube of the invented hinged connector with removable panel removed to accommodate alternative downspout; end view;

FIG. 3E, input tube of the invented hinged connector with alternative downspout outline; cross section along plane 3B from FIG. 1;

FIG. 4A, improved hinged connector in usage position during water flow; partial cross section, side elevation; and FIG. 4B, improved hinged connector in usage position during water flow, with alternative downspout and extension; partial cross section, side elevation.

DESCRIPTION OF THE INVENTION

The preferred embodiment of the improved hinged connector is generally indicated as 10 in FIG. 1. Hinged connector 10 consists of two main sections attached by hinge pins 12; these sections are outflow tube generally indicated at 14 and input tube generally indicated at 18.

Outflow tube 14 has an integral projecting U-flange portion 15 which fits alongside and outside U-flange 19 of downspout tube 18. Note that outflow tube 14 steps down in size, as is obvious in FIG. 2, showing a small drainpipe extension 30 (ghosted) snugly fit over a smaller step 14', and a larger drainpipe extension 32 (also ghosted) snugly fit over the larger step 14".

Input tube 18, to refer again to FIG. 1, can be seen to have similarly larger step 18" and smaller step 18'. In addition, input tube 18 has removable side panel 28, which snaps on or off from larger step 18". The shape of input tube 18 may be more readily appreciated with reference to FIG. 3A, which is a cross section of larger step 18" along the lines 3A from FIG. 1. Similarly, the cross section of small step 18' is shown in FIG. 3B. These shapes will now be explained in conjunction with the use of the improved connector 10.

In FIG. 3C, industry standard 2¼"×3¼" "rectangular" metal pipe external surface 40 (which actually is made with slightly rounded corners 40') fits snugly into corresponding rounded channels 100 in input tube 18. 2¼"×3" rectangular vinyl pipe, owing to its thicker wall, will also fit sufficiently snugly in these same channels 100, and so ghosted pipe 40 can be taken to represent the external surface of this size of vinyl pipe also. Also shown on FIG. 3C is 2⅝"×2⅝" (approximately square) metal pipe external surface 42, shown ghosted, which fits into lower corners 101 of input tube 18 and underneath panel 28. In FIG. 3D, nominal 2½"×2½" square vinyl pipe external surface 43 is accommodated by removal of the panel 28. FIG. 3E, a cross section along 3B from FIG. 1 of smaller step 18' shows 3" round metal pipe external surface 44, ghosted, inserted snugly along channel 104 of input tube 18, 2¾" round vinyl pipe external surface would fit in the same path as this metal pipe external surface 44. Support projections 46 held keep surface 44 firmly in place.

Two of the thirty-six possible combinations are shown schematically in FIGS. 4A and 4B (this thirty-six is calculated by each of the six types being accommodated on both the input tube 18 and the outflow tube 14; the other thirty-four combinations are not shown).

In the example of FIG. 4A, during water flow, connector 10 operates as follows: water flows along path of arrow F from 3" round metal downspout 44, over input U-flange 19, onto output U-flange 15, through outflow larger step 14", through outflow smaller step 14', and into extension 50, which may, for example, be 2½"×2½" square vinyl pipe.

A second illustrated example of the multiple combinations possible is shown in FIG. 4B, where instead the downspout is 2¼"×3" rectangular vinyl pipe 47 and the extension is 2¾" round vinyl pipe 51. Water flows again along path indicated as arrow F.

As described in detail in the corresponding U.S. Ser. No. 07/990,046 which, as mentioned previously, disclosed a connector without the improvements described herein, storage of extending portion of the system described herein (such as extension 51 and attached outflow tube 14, in FIG. 4A) involves merely pivoting the connector 10 at hinge pins 12. (Such pivoting is not illustrated herein.)

Securement of connector 10 in the pivoted position, as well as secure attachment of the downspout and extensions to the connector 10, are identical to that disclosed in the corresponding U.S. Pat. No. 5,375,891 and are not itemized herein.

Finally, it should be noted that whereas a particular hinged connector 10, such as that shown in FIGS. 1 through 5, is designed to accommodate particular common cross sections of pipe, such a hinged connector 10 will also be fittable by other close sizes and shapes of downspout and drainage extension pipe, with small amounts of adaptation, since such pipe commonly is made of thin metal or plastic that can be easily bent or formed at such a join. Thus virtually all known, and probably many heretofore unknown, residential downspouts and extensions can be fitted to this universal hinged connector.

The foregoing is by example only and the scope of the invention should be limited only by the appended claims.

What is claimed is:

1. An improved hinged connector for allowing residential downspout pipes to be connected to extension pipes in which downspouts with cross sections chosen from the group containing: 3" round metal pipe; 2⅝"×2⅝" square metal pipe; 2¼"×3¼" rectangular metal pipe; 2¼"×3" rectangular vinyl pipe; and 2¾" round vinyl pipe, may be connected to extension pipes with cross sections chosen from the same group, said connector comprising:

(a) in input tube comprising:
      a first input tube segment with an approximately square cross section except that the sides of the square are constructed with channels parallel to the tube longitudinal axis (LA), said channels fashioned to accommodate the insertion of downspouts chosen from the group containing: 2⅝"×2⅝" square metal pipe; 2¼"×3¼" rectangular metal pipe; 2¼"×3" vinyl pipe;
      a second input tube segment extending from and parallel with the longitudinal axis of the first segment, said second segment having a smaller cross section than that of the first segment, and having also channels parallel to the longitudinal axis of the tube, said channels fashioned to accommodate downspout tubing chosen from the group containing: 3" round metal pipe; 2¾" round vinyl pipe; and
      an input flange extending from and parallel with the longitudinal axis of said second input tube segment;

(b) an outflow tube comprising:
      a first outflow tube segment that tapers larger in the direction opposite to that of water flow; said segment having a minimum cross sectional diameter smaller than, and a maximum cross sectional diameter larger than, the smallest minimum inside diameter in the group of drainage extensions;
      a second outflow tube segment that tapers larger in the direction opposite to that of water flow; said second outflow segment extending from the first outflow segment and parallel with its longitudinal axis; with the minimum diameter of the second outflow segment being smaller than, and the maximum diameter of the second outflow segment being larger than, the largest minimum inside diameter in the group of drainage extensions; and (c) pivot pin means through said flange at right angles to the longitudinal axis of said input and outflow tubes allowing said two tubes to hinge relative to one another;
      whereby a person may accommodate any of the group of downspouts inside the input tube and any of the group of extensions over top of the outflow tube so that water flows from the downspout through the connector and into the drainage extension.

2. An improved connector as in claim 1, wherein the first input tube segment further comprises a removable side panel wherewith a downspout with one dimension too large to fit inside the first input tube segment may be accommodated by removal of said panel.

3. An improved connector as in claim 2, in which the downspout accommodated by the removal of the side panel is 2½"× 2½" square vinyl pipe.

4. An improved connector as in claim 3, in which the tapered outflow segments have cross sections that are approximately square with rounded corners.

* * * * *